United States Patent
Takahashi et al.

(10) Patent No.: US 8,760,022 B2
(45) Date of Patent: Jun. 24, 2014

(54) MOTOR MOUNTING PLATE

(75) Inventors: Yuuki Takahashi, Kitasaku-gun (JP);
Yuzuru Suzuki, Kitasaku-gun (JP);
Masaki Ogushi, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 324 days.

(21) Appl. No.: 13/177,339

(22) Filed: Jul. 6, 2011

(65) Prior Publication Data
US 2012/0025649 A1 Feb. 2, 2012

(30) Foreign Application Priority Data
Jul. 27, 2010 (JP) ................................. 2010-168075

(51) Int. Cl.
*H02K 5/00* (2006.01)
(52) U.S. Cl.
USPC ............................................ 310/91; 310/402
(58) Field of Classification Search
USPC ....................... 310/89, 91, 402, 405
See application file for complete search history.

(56) References Cited

U.S. PATENT DOCUMENTS

| | | | | |
|---|---|---|---|---|
| 3,830,595 A | * | 8/1974 | Carpenter et al. | 417/363 |
| 5,281,878 A | * | 1/1994 | Schaeffer | 310/91 |
| 6,104,114 A | * | 8/2000 | Takeda et al. | 310/90 |
| 6,860,466 B2 | * | 3/2005 | Sakurai et al. | 251/129.11 |
| 2004/0000828 A1 | | 1/2004 | Kobayashi et al. | |

FOREIGN PATENT DOCUMENTS

| | | |
|---|---|---|
| JP | A-08-182245 | 7/1996 |
| JP | A-2001-054254 | 2/2001 |
| JP | A-2001-095191 | 4/2001 |
| JP | A-2003-324929 | 11/2003 |
| JP | A-2008-029175 | 2/2008 |

* cited by examiner

Primary Examiner — Thanh Lam
(74) Attorney, Agent, or Firm — Oliff PLC

(57) ABSTRACT

A motor mounting plate, composed of a metallic plate, includes: a disc-shaped plate body having a mounting portion to which a motor is mounted, and at least three flanges formed at a circumferential edge of the plate body, the flanges mounted at predetermined locations, an angle between adjacent flanges around the center of the plate body is 140° to 180°.

9 Claims, 11 Drawing Sheets

MOTOR MOUNTING PLATE

BACKGROUND OF THE INVENTION

1. Field of the Invention

The present invention relates to a motor mounting plate for mounting a motor at a predetermined location in apparatuses such as electrical equipment.

2. Related Art

In various electrical equipment such as office equipment, a motor such as a stepping motor is used as a driving source and is mounted at a predetermined location of a frame via a mounting plate in ordinary cases (See Japanese Patent Application, First Publication No. 2001-095191 and Japanese Patent Application, First Publication No. 2008-029175). As such a motor mounting plate, a plate produced by drawing a metallic plate and a plate composed of aluminum die-cast metal having high rigidity are provided. Furthermore, a motor mounting plate in which vibration can be reduced by using an antivibration rubber is known (See Japanese Patent Application, First Publication No. 2001-095191 and Japanese Patent Application, First Publication No. 2008-029175).

SUMMARY OF THE INVENTION

In a motor mounting plate composed of a metallic plate, resonance is caused by a rotation of a motor and vibration provided from the outside, and a plate portion is highly deformed by the resonance. For avoiding resonance, the relationship between number of slots and number of poles are individually designed so as to avoid values of natural vibration frequency of the mounting plate, or the natural vibration frequency must be designed so as to avoid the values of frequencies in which excitation force calculated from the number of the slots and number of the poles is large, so that complicated designing is required. Furthermore, an aluminum die-cast product is expensive and is unfavorable for cost reduction. When an antivibration rubber is used, the antivibration performance thereof varies according to the environment in which it is used, and the rubber degrades over time, so that use is limited and replacement maintenance is necessary.

The present invention was completed according to the above circumstances. An object of the present invention is to provide a technique in which, in amounting plate composed of a metallic plate having a relative cost advantage, resonance can be effectively inhibited even though it has simple design and structure.

A motor mounting plate composed of a metallic plate according to a first aspect of the present invention includes a disc-shaped plate body having a mounting portion to which a motor is mounted; and at least three flanges are formed at a circumferential edge of the plate body and are mounted at predetermined locations; in which one of the angles between adjacent flanges around the center of the plate body is 140° to 180°.

In the motor mounting plate according to a second aspect, one of the angles between the adjacent flanges around the center of the plate body is 160° to 180°.

In the motor mounting plate according to a third aspect, a linear portion is formed at a divided circumferential edge between the flanges.

In the motor mounting plate according to a fourth aspect, a rib is formed between the plate body and the flange.

In the motor mounting plate according to the first aspect, vibration in the first mode having the greatest amplitude and sound pressure can be reduced by a structure composed of a metallic plate without using an antivibration rubber and an effect in which resonance can be effectively inhibited by simple design and simple structure can be obtained.

In the motor mounting plate according to the second aspect, the vibration in the first mode can be more effectively reduced.

In the motor mounting plate according to the third aspect, the vibration in the first mode can be more effectively reduced. Furthermore, the vibration in the sixth mode can be reduced.

In the motor mounting plate according to the fourth aspect, the vibration in the first mode can be more effectively reduced.

BRIEF DESCRIPTION OF DRAWINGS

FIGS. 1A and 1B are views showing basic structures similar to a motor mounting plate of the present invention, in which FIG. 1A is a schematic view and FIG. 1B is a plane view thereof.

FIGS. 11A and 11B are schematic views of the motor mounting plate in accordance with an embodiment of the present invention, wherein FIG. 11A is a schematic view showing a condition in which the motor is not mounted, and FIG. 10B is a schematic view showing a condition in which the motor is mounted.

DESCRIPTION OF PREFERRED EMBODIMENTS

Figure 1A:
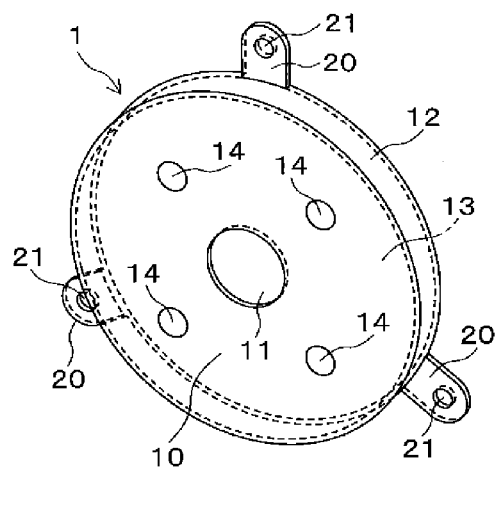
Figure 1B:
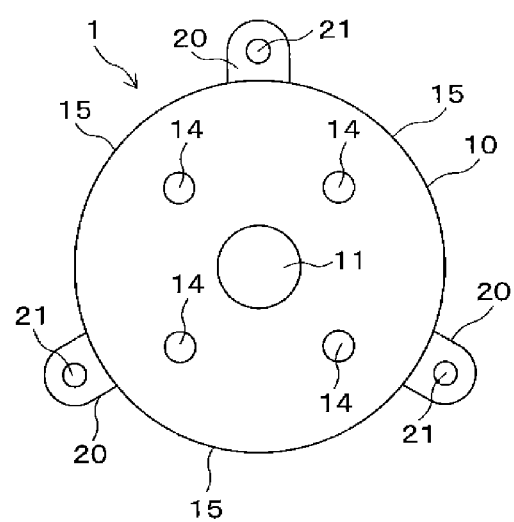

Embodiments of the present invention are explained hereinafter. FIGS. 1A and 1B are views showing basic structures similar to a motor mounting plate (hereinafter referred to simply as "mounting plate") of the present invention. The mounting plate 1 is formed by drawing a metallic plate and is mainly composed of a disc-shaped plate body 10, in which a circular hole 11 is formed at the radial center thereof. The plate body 10 has an annular peripheral wall 12 that is formed around a circumferential edge portion thereof and is perpendicularly bent toward the rear surface side, so that a recess 13 is formed at the rear surface side of the plate body 10. Three or more flanges 20 (three flanges are formed in this embodiment) extended toward the radially outward direction are formed at an end edge of the peripheral wall 12.

In the plate body 10, plural screw holes 14 for mounting a motor by screwing are formed, and the motor is mounted to a front surface of the plate body 10 via the screw holes 14. Three flanges 20 are formed at equally spaced locations in the circumferential direction and the portion between the flanges 20 is defined as a divided circumferential edge portion 15. Each angle formed between the flanges 20 around the radial center is 120° and is the same as the others. A screw inserting through hole 21 is formed in each flange 20. In the mounting plate 1 in which a motor is mounted to the plate body 10 via the screw holes 14, the flanges 20 are tightened at a predetermined location in equipment such as a frame by screwing a screw or a bolt which is inserted into the screw inserting through holes 21 of the flanges 20 at a predetermined location thereof.

Figure 2A:
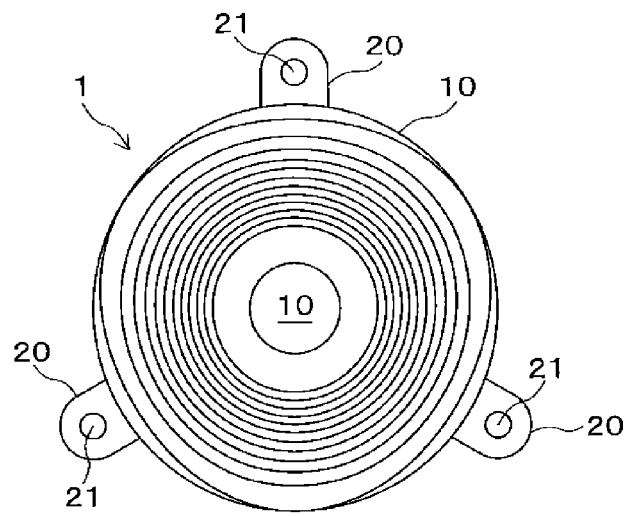
FIG. 2A is a view showing a condition of vibration in a first mode occurring in the motor mounting plate shown in FIGS. 1A and 1B.

As shown in FIG. 2A, vibration in a first mode occurring in the mounting plate 1 shown in FIGS. 1A and 1B expands as a wave pattern. In FIGS. 2A to 8C, wavy lines drawn in the plate body 10 indicate strength of vibrational waves and the screw hole 14 is not shown therein. The vibration in the first mode expanding as a wave pattern has the greatest amplitude and the strongest sound pressure. Therefore, in the present invention, structures described in the following patterns are added to the mounting plate 1 having the basic structure shown in FIGS. 1A and 1B, so that a structure in which vibration in the first mode expanding as a wave pattern can be reduced is obtained.

(A) One of the angles between the flanges 20 around the center is 140° to 180°.

(B) In the above pattern (A), a linear portion is formed at the divided circumferential edge portion 15 between the flanges 20.

(C) In the above pattern (A) or (B), a rib is formed between the plate body 10 and the flanges 20.

Figure 3A:
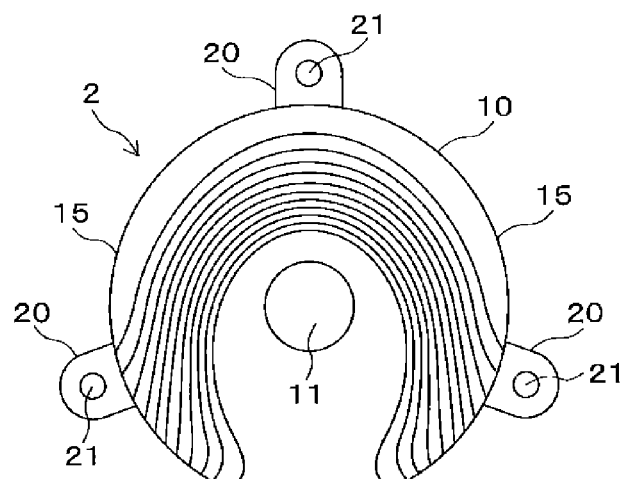
FIGS. 3A, 3B, and 3C are views showing conditions in which the vibration in the first mode shown in FIG. 2A changes to a vibration in a second mode in an embodiment (varying an angle between the adjacent flanges around the center) of the present invention.
Figure 3B:
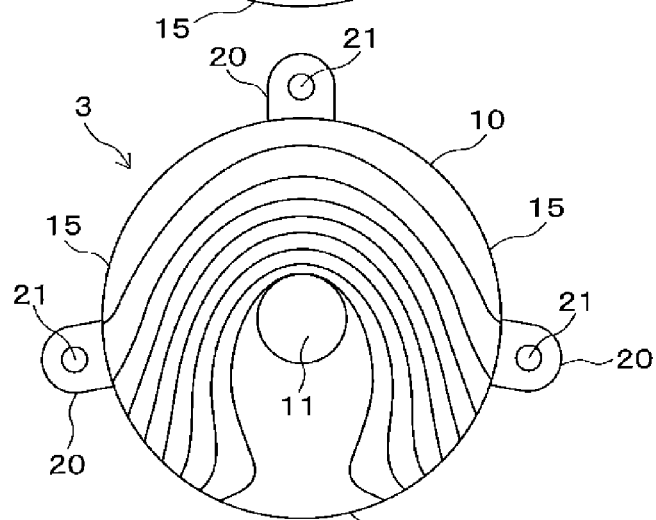
Figure 3C:
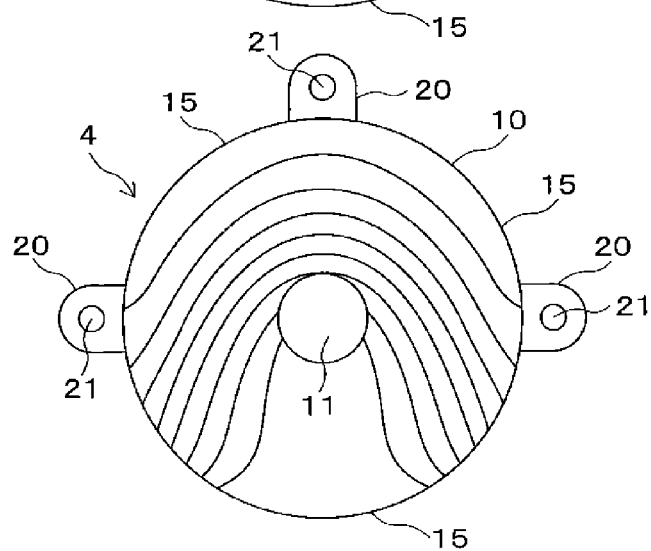

Mounting plates 2, 3 and 4 of the above pattern (A) in which each angle between two flanges 20 disposed at a lower side of the mounting plate 1 having the basic structure shown in FIGS. 1A and 1B set at 140°, 160° or 180° are shown in FIGS. 3A, 3B and 3C. In the mounting plate 1 having the basic structure in which the flanges 20 are disposed at equally spaced locations, the vibration expanding as a wave pattern occurs. However, in the mounting plates 2, 3 and 4 shown in FIGS. 3A, 3B and 3C, the mode of the vibration is changed to a second mode, so that the vibration in the first mode can be reduced.

Figure 2B:
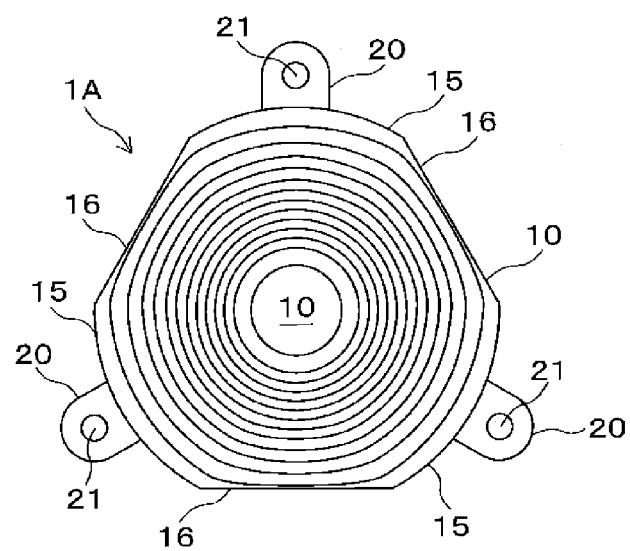
FIG. 2B is a view showing a condition of a vibration in the first mode occurring in the motor mounting plate shown in FIGS. 1A and 1B, when a linear portion is formed on divided circumferential edge portions.

Next, FIG. 2B shows a mounting plate 1A having a structure in which linear portions 16 are formed at the divided circumferential edge portions 15 between the flanges 20 of the mounting plate 1 having the basic structure. Each linear portion 16 is parallel to a line passing through the screw inserting through holes 21 of the adjacent flanges 20. In this mounting plate 1A, the vibration in the first mode occurs as a wave pattern.

Figure 4A:
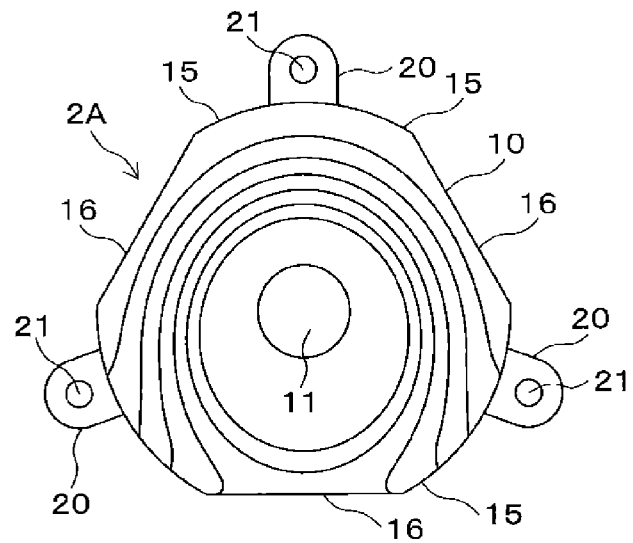
FIGS. 4A, 4B, and 4C are views showing conditions in which the vibrations in the first mode shown in FIG. 2B changes to a vibration in the second mode in an embodiment (varying the angle between the adjacent flanges around the center and forming a linear portion in the divided circumferential edge portions) of the present invention.
Figure 4B:
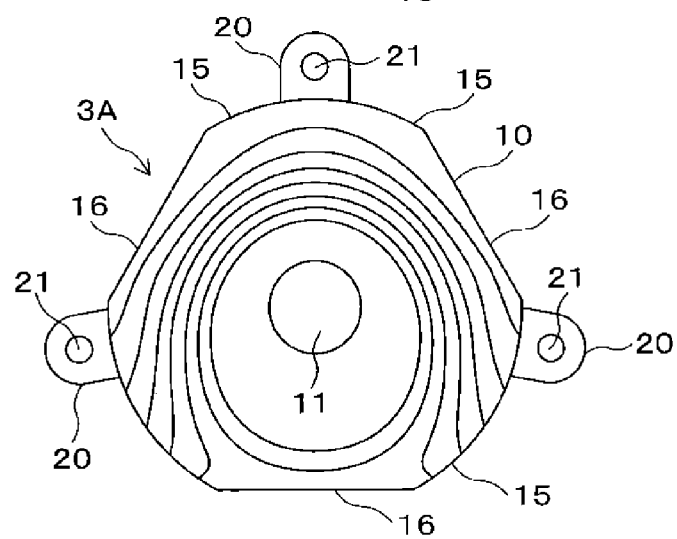
Figure 4C:
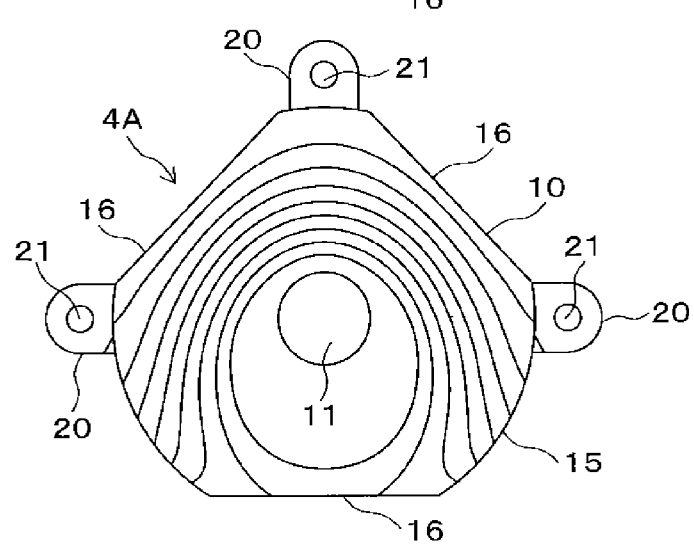

As shown in FIGS. 4A to 4C, in each mounting plate 2, 3 and 4 in FIGS. 3A, 3B and 3C, the linear portion 16 is formed at the divided circumferential edge portion 15 between the flanges 20, and mounting plates 2A, 3A and 4A having the structure of the pattern (B) are obtained. That is, the linear portions 16 are formed at three divided circumferential edge portions 15 of the mounting plates 2, 3 and 4 in which each angle between the flanges 20 is set at 140°, 160° or 180°. In the structure composed of the pattern (A) and the pattern (B), in which the linear portion 16 is formed at the divided circumferential edge portion 15 and each angle between the flanges 20 is set at 140°, 160° or 180°, the mode of the vibration changes to the second mode, so that the vibration in the first mode can be reduced.

Figure 5A:
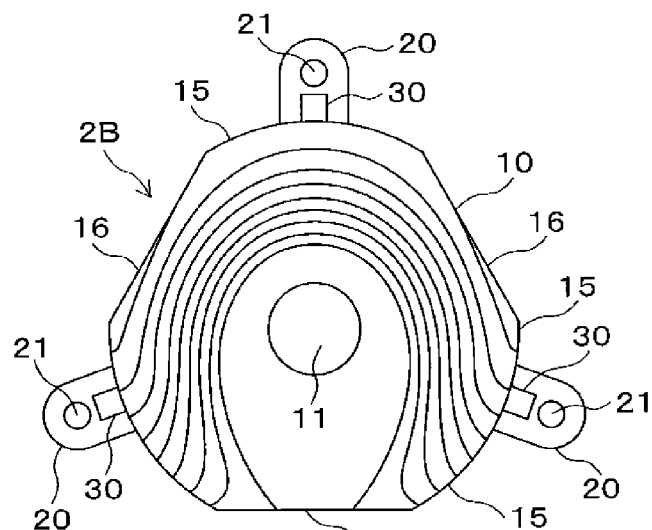
FIGS. 5A, 5B and 5C are views showing conditions in which the vibration in the first mode shown in FIG. 2B changes to vibrations in the second mode in an embodiment (varying the angle between the adjacent flanges around the center, forming the linear portions in the divided circumferential edge portions and forming a rib between the plate body and the flange) of the present invention.
Figure 5B:
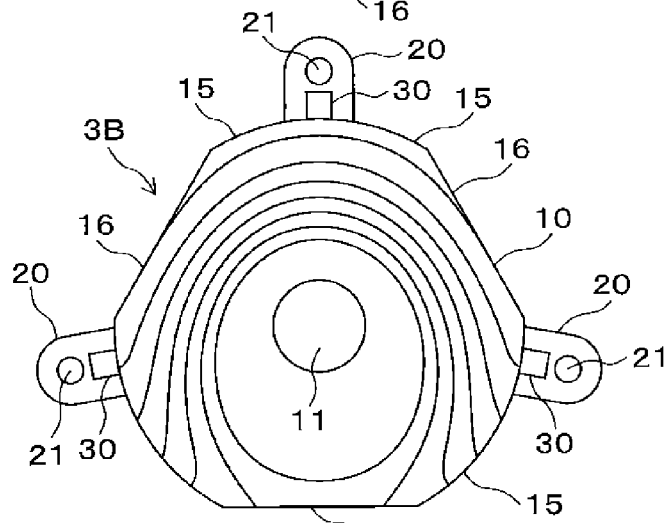
Figure 5C:
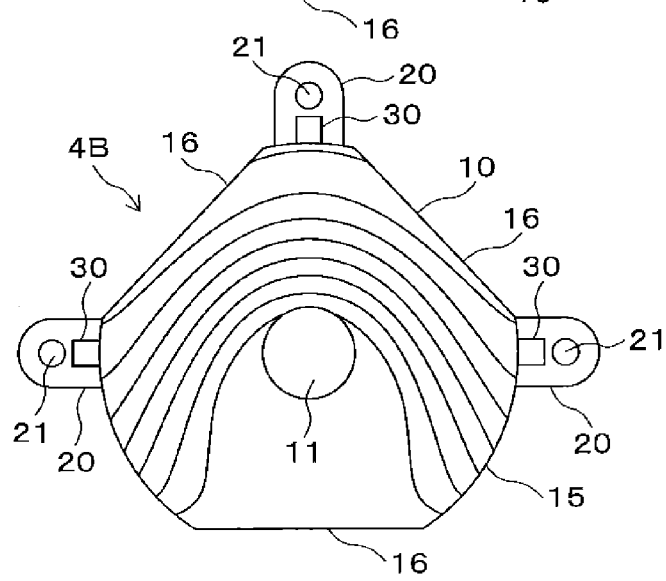

Next, mounting plates 2B, 3B and 4B shown in FIGS. 5A, 5B and 5C have structures of the pattern (C) in which the ribs 30 are formed between each plate body 10 and each flange 20 of the mounting plates 2A, 3A and 4A shown in FIGS. 4A, 4B and 4C. In the mounting plates 2B, 3B and 4B having the structure of the pattern (C), in which the linear portions 16 are formed at the divided circumferential edge portions 15, each one of the angles between flanges 20 is set at 140°, 160° or 180° and the ribs 30 are formed between each plate body 10 and each flange 20, the mode of the vibration changes to the second mode, so that the vibration in the first mode can be reduced.

Figure 2C:
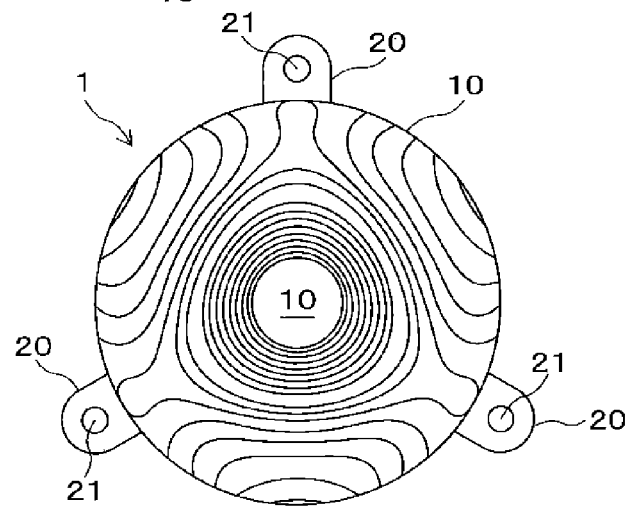
FIG. 2C is a view showing a condition of vibration in a sixth mode occurring in the motor mounting plate shown in FIGS. 1A and 1B.
Figure 6:
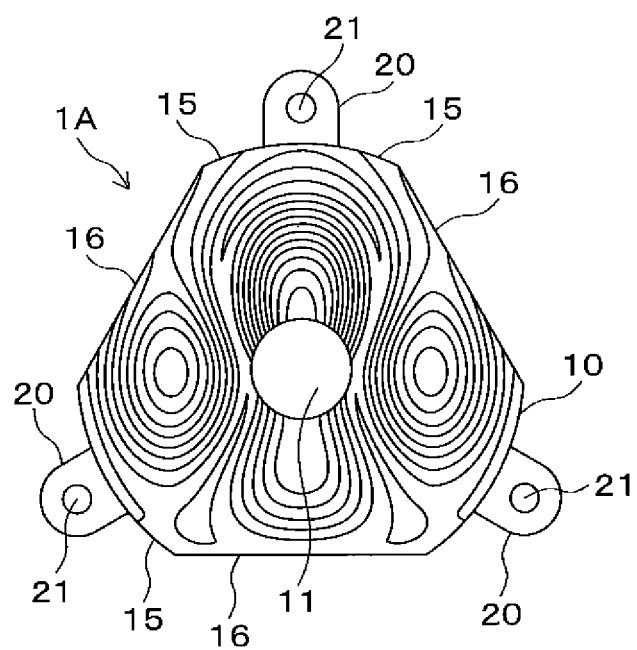
FIG. 6 is a view showing a condition in which the vibration in a sixth mode occurring in the motor mounting plate shown in FIG. 2B changes to a vibration in a high-order mode.

FIG. 2C shows a case in which vibration in the sixth mode occurs in the mounting plate 1 having the basic structure shown in FIGS. 1A and 1B. In this case, the vibration expanding as a wave pattern occurs. Therefore, as shown in FIG. 6, when the pattern (B) in which the linear portions 16 are formed at the divided circumferential edge portions 15 between the flanges 20 of the mounting plate 1 having the basic structure is added to this case, the sixth mode changes to a high-order mode, so that the vibration can be reduced.

Figure 7A:
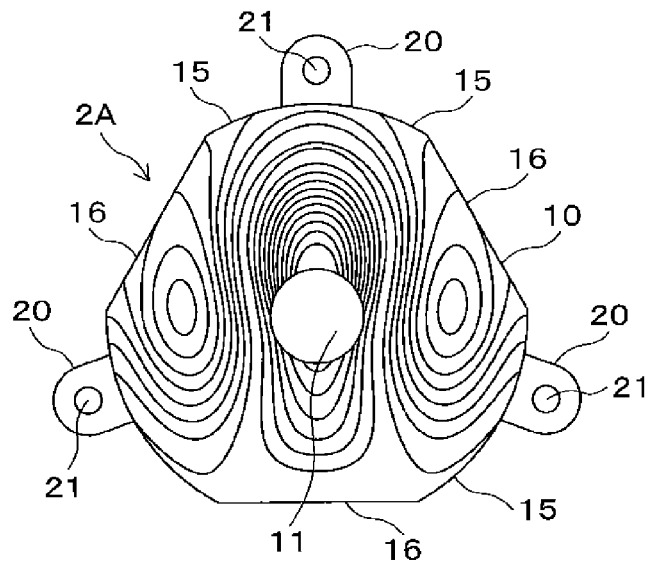
FIGS. 7A, 7B and 7C are views showing conditions in which the vibration in the sixth mode occurring in the motor mounting plates shown in FIGS. 4A, 4B and 4C changes to vibrations in a high-order mode.
Figure 7B:
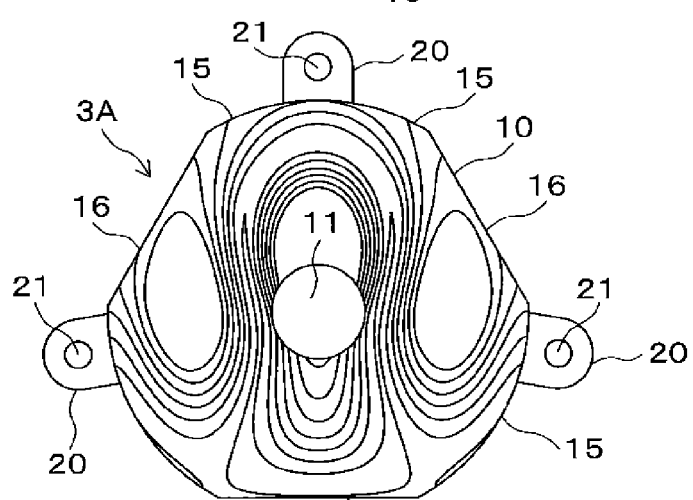
Figure 7C:
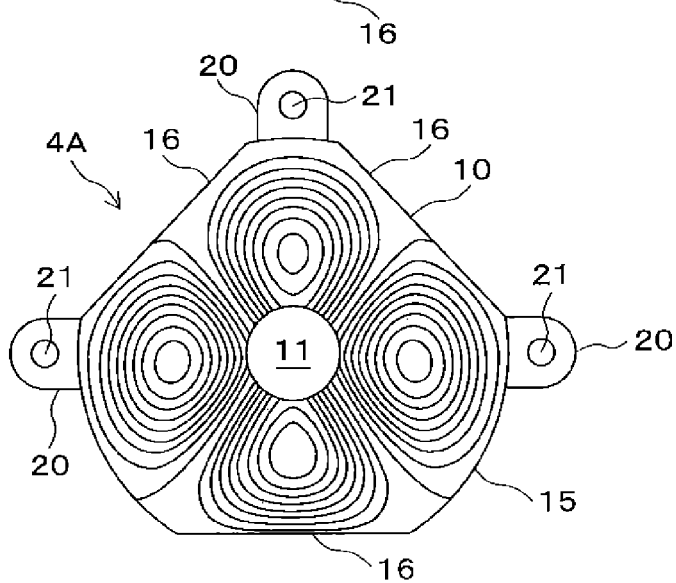
Figure 8A:
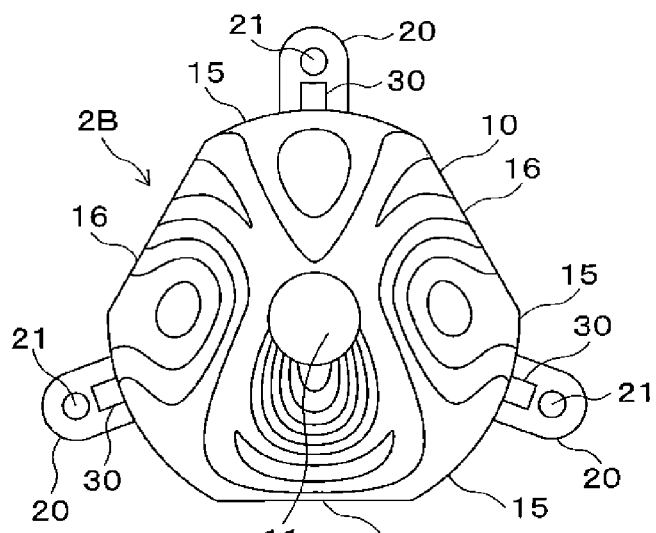
FIGS. 8A, 8B and 8C are views showing conditions in which the vibrations in the sixth mode occurring in the motor mounting plates shown in FIGS. 5A, 5B and 5C turn into vibrations in a high-order mode.
Figure 8B:
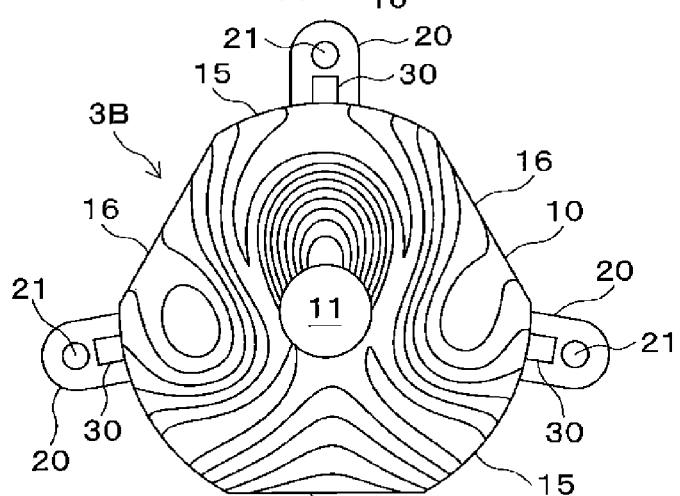
Figure 8C:
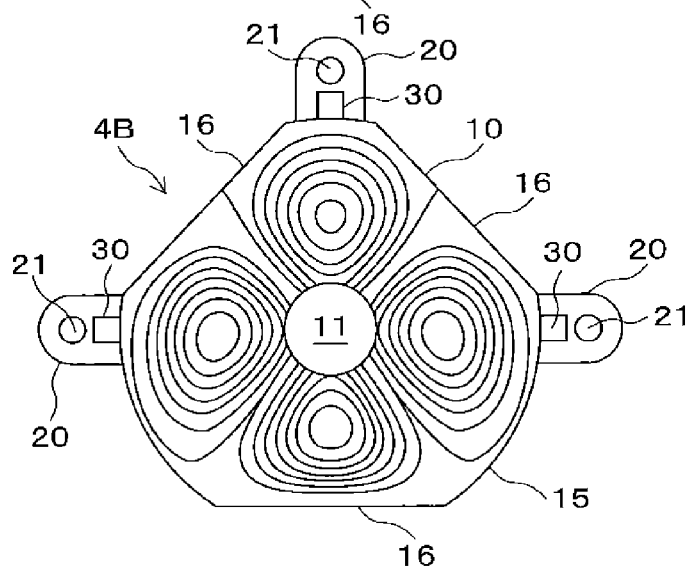

FIGS. 7A to 7C show cases in which vibration in the sixth mode occurs in the plates 2A, 3A and 4A shown in FIGS. 4A, 4B and 4C and the mode of each vibration changes to the high-order mode. FIGS. 8A to 8C show conditions in which the vibrations in the sixth mode occur in the plates 2B, 3B and 4B shown in FIGS. 5A, 5B and 5C, and the mode of each vibration changes to the high-order mode.

Next, more specific examples of the mounting plate of the present invention are explained, again with reference to FIG. 9 and FIGS. 10A and 10B.

Figure 9:
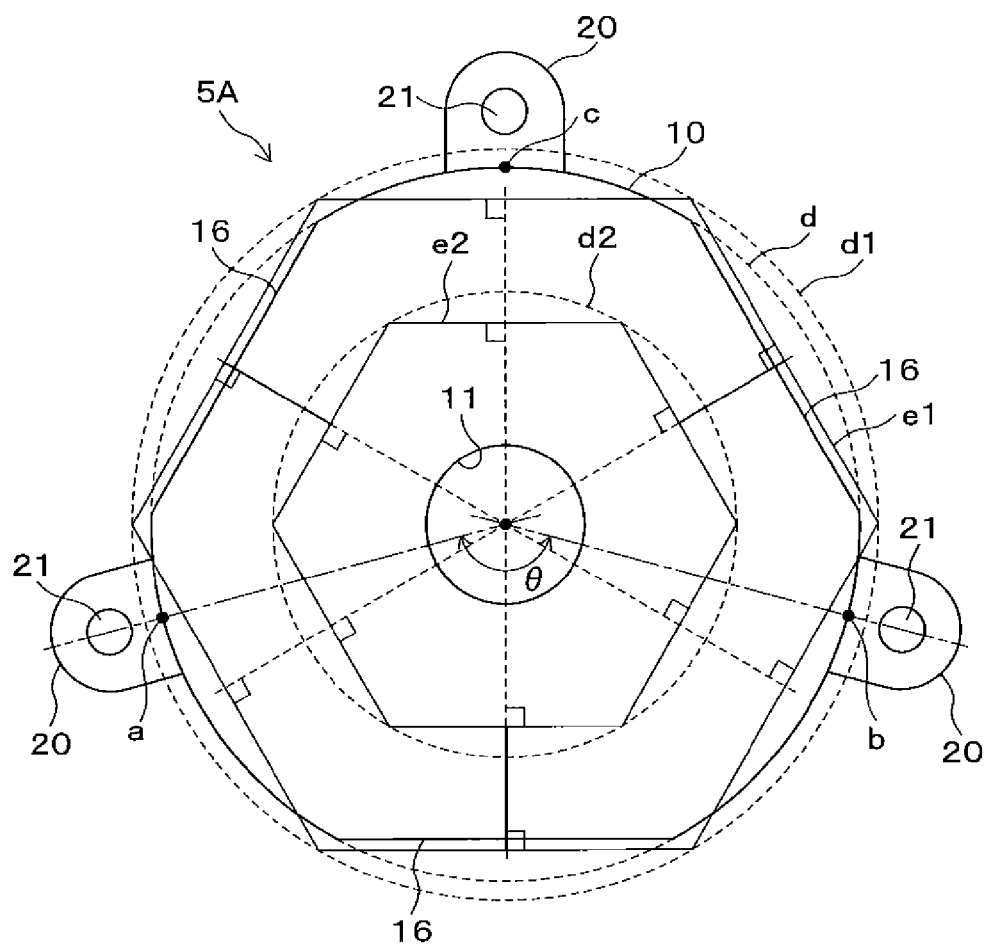
FIG. 9 is a plane view of the motor mounting plate in accordance with an embodiment of the present invention.

FIG. 9 shows a mounting plate having a structure in which the structures of the pattern (A) and the pattern (B) are combined. In the mounting plate 5A, three flanges 20 are formed and the angle θ between two flanges 20 in the lower side is 140° to 180°.

In this case, a virtual circle passing through base end portions a, b and c as a bending portion of the flanges 20 from the peripheral wall 12 is defined as d. A virtual circle that is coaxial with the virtual circle d and has a diameter 1.05 times the diameter of the virtual circle d is defined as d1. A virtual circle that is coaxial with the virtual circle d and has a diameter 0.65 times the diameter of the virtual circle d is defined as d2. A regular hexagon of which each apex is on a circumference of the virtual circle d1 is defined as e1 and a regular hexagon of which each apex is on the virtual circle d2 and each apex angle is the same as that of the regular hexagon e1 is defined as e2. When vertical lines are drawn from a center "o" of the virtual circle d to each side of the regular hexagon e1, the linear portion 16 is positioned on the virtual lines from the center o between the hexagon e1 and the hexagon e2. An angle between the point "a" and the point "b" around the center "o" is the angle between the flanges 20 and is 140° to 180°.

Figure 10A:
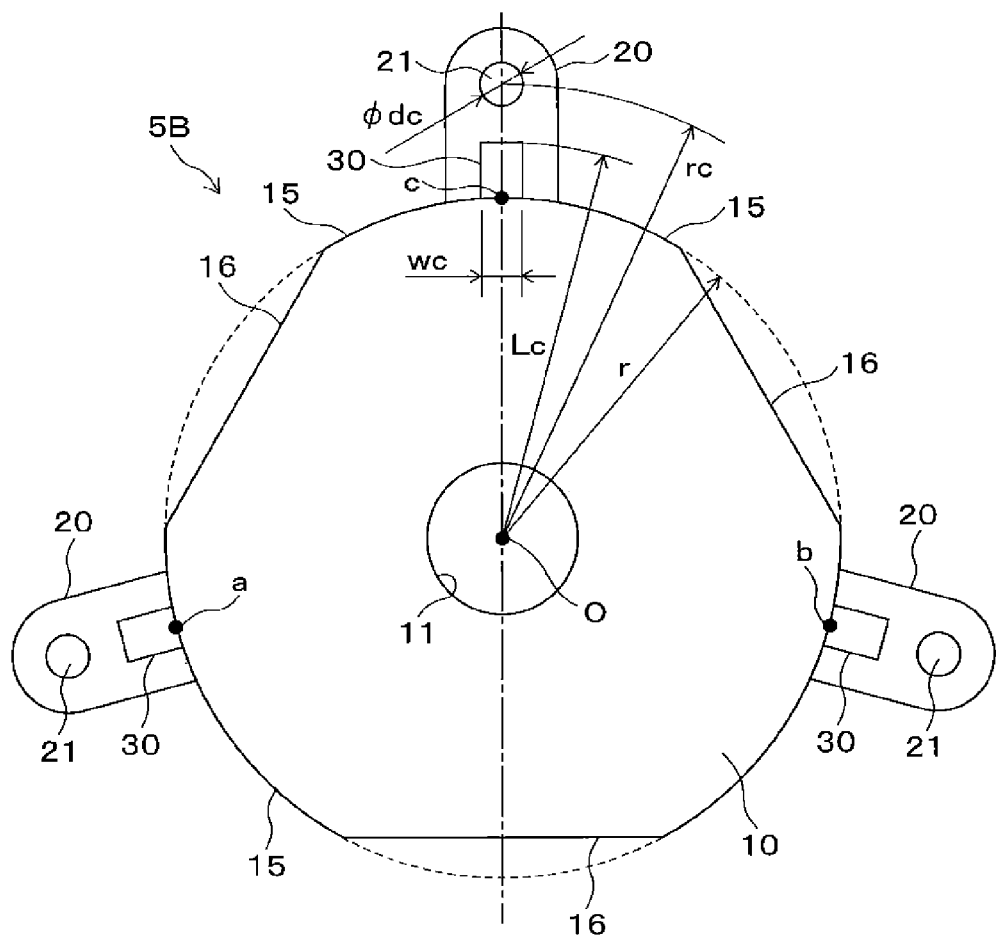
FIG. 10A is a plane view of the motor mounting plate in accordance with the embodiment of the present invention and FIG. 10B is a side view thereof.
Figure 10B:
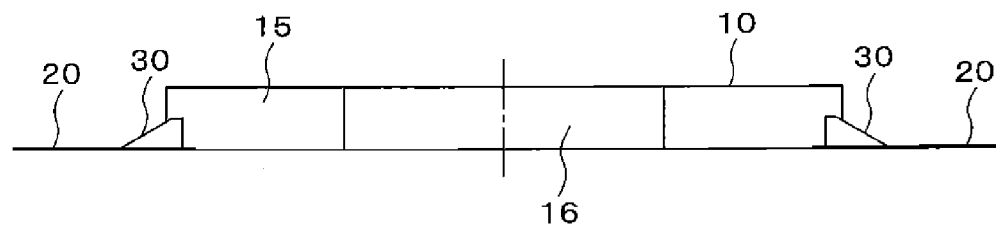

The mounting plate 5B shown in FIGS. 10A and 10B has a structure of the pattern (C) in which a rib 30 is formed between the plate body 10 and the flange 20 of the mounting plate 5A shown in FIG. 9. The rib 30 in this case has a rectangular shape in a plane view and is formed in a tapered shape having a rising slope toward the plate body 10.

In this case, when the center of the virtual circle passing through the base end portions a, b and c is defined as "o", the radius of the virtual circle is defined as "r" and the distance between the center "o", the center of the screw inserting through hole 21 is defined as "rc", the vibration in the first mode easily occurs if "rc" satisfies rc 1.15r, so that the vibration in the first mode is inhibited by a structure in which the ribs 30 are formed. In the structure, the width "wc" of the rib 30 is set at 0.25 times a diameter "dc" or more of the screw inserting through hole 21 of the flange 20 and the length "Lc" of the rib 30 is set at 1.14 times r or more (within the range of the length in which interference with respect to the screw for mounting the flange 20 can be avoided). The shape of the rib 30 in the plane view is not limited to the rectangular shape. Furthermore, the shape thereof may not be tapered but may have a uniform thickness.

In the present invention, dimensional setting satisfying the condition shown in FIG. 9 or FIGS. 10A and 10B is preferable.

Figure 11A:
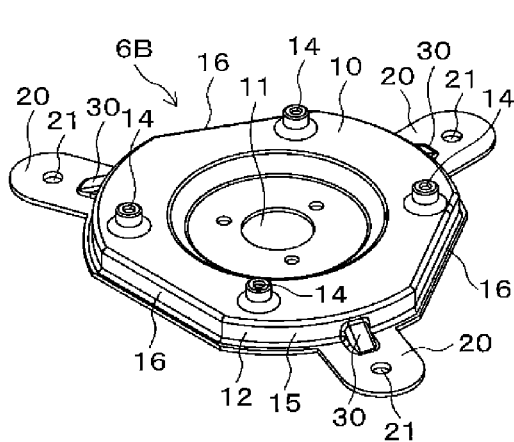
Figure 11B:
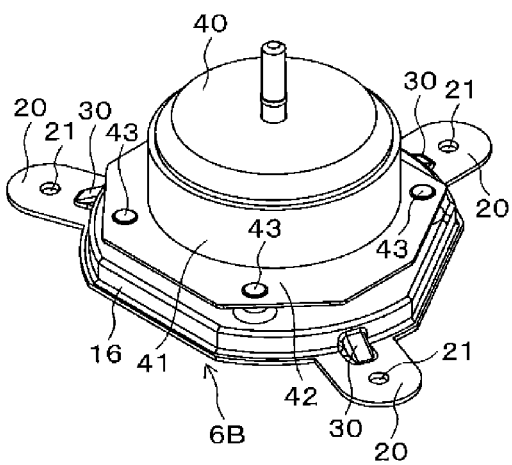

FIG. 11A shows another specific example of the mounting plate. In the mounting plate 6B, the angle between two flanges 20 around the center is 140° and the plural screw holes 14 (in this case, four screw holes) are formed at the plate body 10. The ribs 30 are formed between the plate body 10 and the flanges 20. As shown in FIG. 11B, a flange 42 of a housing 41 of a motor 40 (such as an outer-rotor-type brushless motor) is tightened to the plate body 10 by screwing screws 43 passing through the flange 42 into the screw hole 14, so that the motor 40 is mounted to the mounting plate 6B. The mounting plate 6B is mounted at a predetermined location by screwing using the screw inserting through hole 21.

Figure 12A:
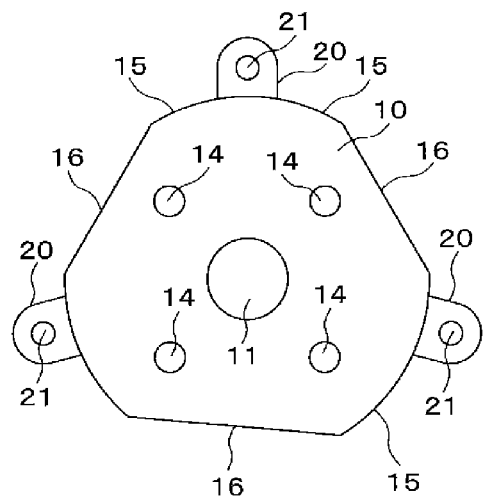
FIGS. 12A and 12B are plane views showing motor mounting plates of modifications of an embodiment.
Figure 12B:
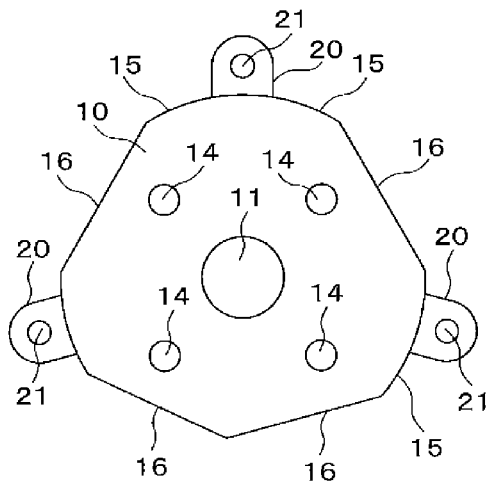

The present invention is not limited to the mounting plates having these explained structures. For example, as shown in FIG. 12A, the linear portion 16 may not be parallel to the line passing through the screw inserting through holes 21 of the adjacent flanges 20, and as shown in FIG. 12B, plural (two) linear portions 16 may be formed at one divided circumferential edge portion 15. The mounting plate may be produced not only by drawing a metallic plate, but also by bending a metallic plate, and may also be produced by die-casting.

What is claimed is:

1. A motor mounting plate composed of a metallic plate, comprising:
a disc-shaped plate body having a mounting portion to which a motor is mounted; and
three flanges formed at a circumferential edge of the plate body and radially projecting therefrom, the flanges mounted at predetermined locations;
wherein one of the angles between adjacent flanges around the center of the plate body is 140° to 180°, and the other angles between other adjacent flanges around the center of the plate body are identical to each other.

2. A motor mounting plate according to claim 1, wherein the one of the angles between the adjacent flanges around the center of the plate body is 160° to 180°.

3. A motor mounting plate according to claim 1, wherein a linear portion is formed at the circumferential edge between the adjacent flanges.

4. A motor mounting plate according to claim 2, wherein the linear portion is formed at the circumferential edge between the adjacent flanges.

5. A motor mounting plate according to claim 1, wherein a rib is formed between the plate body and the flange.

6. A motor mounting plate according to claim 2, wherein the rib is formed between the plate body and the flange.

7. A motor mounting plate according to claim 3, wherein the rib is formed between the plate body and the flange.

8. A motor mounting plate according to claim 4, wherein the rib is formed between the plate body and the flange.

9. A motor mounting plate according to claim 5, wherein the flange has a screw inserting hole with a diameter and the rib has a width that is set at 0.25 times the diameter or more.

* * * * *